Aug. 12, 1958  W. A. McADAMS ET AL  2,846,872
LEAKAGE TESTING METHOD
Filed Aug. 2, 1945

INVENTORS:
William A. McAdams
Martyn H. Foss
BY
Roland A. Anderson
Attorney

United States Patent Office 2,846,872
Patented Aug. 12, 1958

2,846,872

LEAKAGE TESTING METHOD

William A. McAdams, Richland, Wash., and Martyn H. Foss, Santa Fe, N. Mex., assignors to the United States of America as represented by the United States Atomic Energy Commission Application August 2, 1945, Serial No. 608,604

5 Claims. (Cl. 73—45.5)

This invention relates to a method of testing jacketed bodies for leaks and more particularly to a novel method of testing jacketed uranium bodies or slugs adapted for use in a neutronic reactor.

In neutronic reactors a neutron-fissionable isotope such as $U^{233}$, $U^{235}$, or $94^{239}$ or mixtures thereof is subjected to fission by absorption of neutrons, and a self-sustaining chain reaction is established by the neutrons evolved by the fission. In general, such reactors comprise bodies of compositions containing such fissionable material, for example, natural uranium, disposed in a material which slows the neutrons to thermal energies. Such a slowing material is termed a neutron moderator. Carbon, beryllium, and $D_2O$ (heavy water) are typical moderators suitable for such use. Heat is evolved during the reaction which is removed by passage of a coolant through the reactor in heat exchange relationship therewith. The theory and characteristics of such reactors are set forth in the co-pending application of Fermi and Szilard, Serial No. 568,904, filed December 19, 1944, and granted as U. S. Patent No. 2,708,656 on May 17, 1955.

The bodies of fissionable material in a neutronic reactor are customarily jacketed with a neutron-permeable material, such as aluminum, in thermal contact therewith, thereby protecting said bodies from direct contact with the associated coolant. This protection not only prevents corrosion of the bodies and consequent decrease in the neutron reproduction ratio of the reactor, but also prevents contamination of the coolant by radioactive fission products of the reaction. Furthermore, corrosion of the fissionable bodies results in swelling thereof thereby causing said bodies to become tightly fixed within the coolant passages through the reactor. Such a condition may be extremely expensive to correct in requiring shutdown and disassembly of the reactor to remove the swollen bodies. For these reasons, it is imperative that the jacketed bodies be absolutely fluid-tight.

It is, therefore, an object of this invention to provide a novel method of testing jacketed uranium slugs to detect the slightest leaks therein in order to avoid shutdown of the reactor as well as danger to operating personnel who may come into contact with the contaminated coolant discharged from the reactor.

According to the invention, the jacketed body is submerged in water and is placed under a pressure of approximately 150 lbs. per square inch for a period of approximately twenty-four hours. The body is then removed from the water and dried. Thereafter an indicator such as anhydrous copper sulphate is applied to the body in any convenient manner as by sprinkling powdered copper sulfate thereon. The slightest water diffusion from the body will immediately turn the white anhydrous copper sulphate to blue affording immediate and semi-permanent visual indication of water leakage from the jacketed body. The body may be heated or subjected to a vacuum to accelerate diffusion of the water therefrom.

If desired, the indicator may be applied to the body by impregnating a porous material such as paper with the indicator as, for example, by pressing anhydrous copper sulphate into the porous material which may then be formed into a cap or cover. This cover may then be snugly fitted over the jacketed body to bring the indicator into contact therewith.

It may be noted that the very pronounced color change of the copper sulphate makes any slight pinhole leak outstanding, inasmuch as the anhydrous copper sulphate becomes colored only at the point directly over the hole and affords a marked visual indication thereof without the necessity of expensive and complicated apparatus. Furthermore, the copper sulphate will continue to mark the point of leakage until the moisture in the air colors all the indicator. This may require days if the slug is stored in a relatively dry atmosphere.

In the accompanying drawings one embodiment of the process of the invention is illustrated by way of example. In these drawings:

Fig. 2 is a sectional view of the slug of Fig. 1, immersed in liquid under pressure;

Fig. 3 is a sectional view of the same slug after removal from the liquid bath and drying of the surface; it will be seen that the leak is filled with liquid;

Fig. 4 is a sectional view of the surface-dried slug after being coated with anhydrous copper sulfate; and Fig. 5 is a top view of the slug of Fig. 4 showing a blue spot formed over the leak by the conversion, due to the liquid in the leak, of anhydrous copper sulfate to $CuSO_4 \cdot 5H_2O$.

Figure 1:
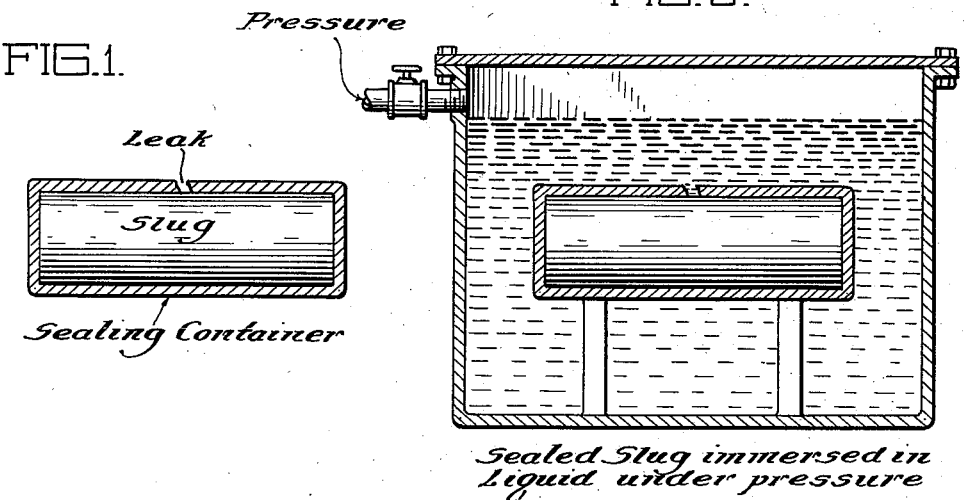
Fig. 1 is a sectional view of a slug to be tested which is enclosed by a jacket.
Figure 1:
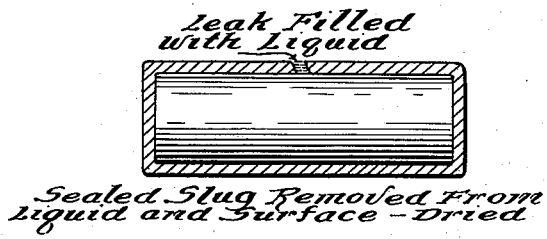
Figure 1:
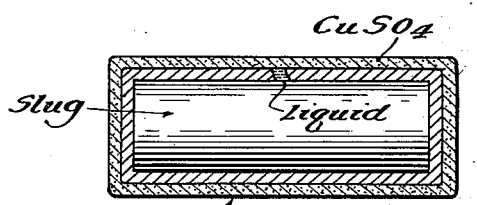
Figure 1:
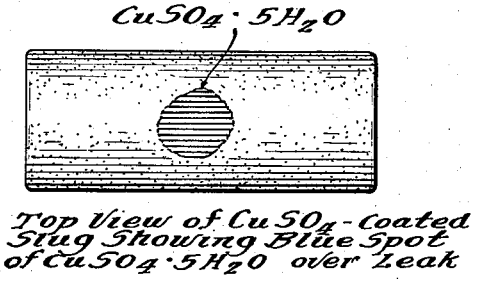

It will be understood that many modifications may be made in the specific embodiments disclosed without departing from the intended scope of the invention which is limited solely by the appended claims.

What is claimed is:

1. A method of testing a sealed container for leaks comprising placing said container in water under pressure, then removing said container from said water, then drying the external surfaces of said container, and then applying anhydrous copper sulphate to said surfaces.

2. A method of testing a sealed container for leaks comprising placing said container in water under pressure, then removing said container from said water and drying the external surfaces of said container, then applying anhydrous copper sulphate to said surfaces, and then heating said container.

3. A method of testing a sealed container for leaks comprising placing said container in water under pressure, then removing said container and drying the external surfaces thereof, then applying anhydrous copper sulphate to said surfaces, and then subjecting said container to subatmospheric pressure.

4. A method of testing a sealed container for leaks comprising placing said container in water under pressure of at least 150 pounds per square inch for approximately twenty-four hours, then removing said container and drying the external surfaces thereof, and then applying anhydrous copper sulphate to said surfaces.

5. A method of testing a sealed container for leaks comprising placing said container in water under pressure, then removing said container and drying the external surfaces thereof, and then fitting around said container a water-free copper sulfate-impregnated paper whereby water retained by and evaporated from leaks colors the dry copper sulfate blue.

References Cited in the file of this patent

UNITED STATES PATENTS

| | | |
|---|---|---|
| 2,254,609 | Kinzer | Sept. 2, 1941 |
| 2,259,400 | Switzer | Oct. 14, 1941 |
| 2,340,940 | DeForest | Feb. 8, 1944 |
| 2,393,996 | Layton | Feb. 5, 1946 |